United States Patent Office 3,197,217
Patented July 27, 1965

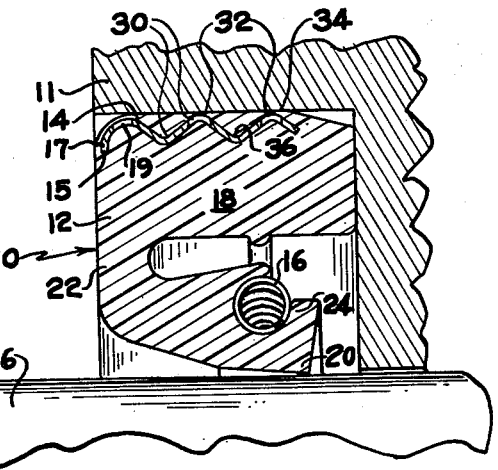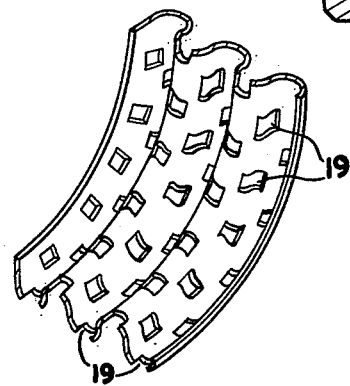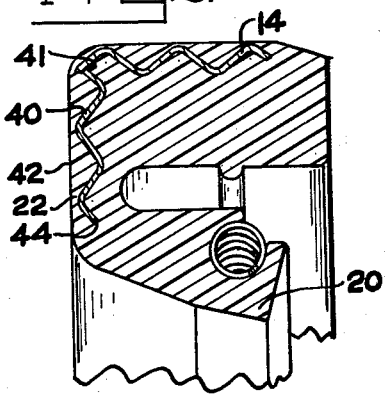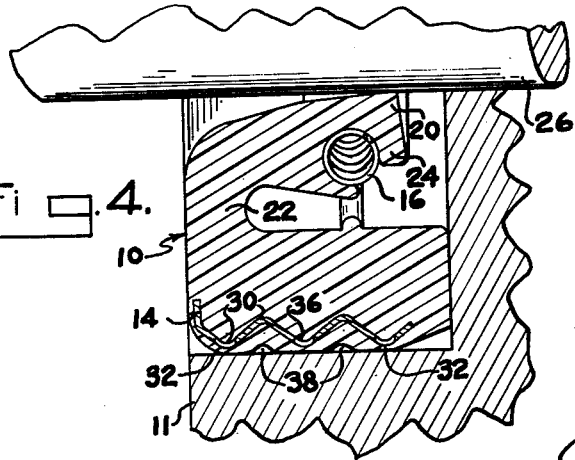

3,197,217
REINFORCED FLUID SEAL
Alex A. Mastrobattista, Greenbrook Township, and Howard J. Bieling, Harrington Park, N.J., assignors, by direct and mesne assignments, to Johns-Manville Corporation, New York, N.Y., a corporation of New York
Filed Aug. 5, 1960, Ser. No. 100,771
6 Claims. (Cl. 277—153)

This invention relates generally to an improved fluid seal. It further relates to fluid-sealing devices, usually for preventing the egress of lubricants or coolants and the ingress of contaminants to structures circumposing rotary or reciprocating shafts and the like. More particularly this invention relates to a fluid seal for use with journal members employed in connection with large diameter steel mill rolls and the like.

In many journal installations, particularly steel mills, elevated operating and ambient temperatures are encountered which cause the conventionally employed type of seals made of elastic material to deform structurally to such an extent that they lose their effectiveness.

Consequently metal reinforcing members have been suggested for use therewith as an attempt to deter deformation. However, the reinforcing members suggested heretofore have been positioned in a manner which subjected the seal to diametral deformation and have relied primarily upon chemical bonding adhesives for adhering the resilient material to the reinforcing member.

In other prior suggested metal reinforced molded seals, portions of the metal surfaces have been openly exposed and subjected to corrosion.

Accordingly, it is an object of our invention to provide a new and improved sealing arrangement wherein the resilient sealing body will withstand elevated temperatures without disrupting the sealing engagement.

Another object of our invention is to provide a sealing member, comprising a resilient body and a reinforcing member, which does not rely upon a chemical agent to form a bond therebetween.

Still another object of our invention is to provide a sealing member having a metal reinforcing member arranged in a body of resilient material to present a plurality of intermittent and concentric retention areas.

The foregoing objects and others ancilliary thereto are preferably accomplished as follows:

According to a preferred embodiment of this invention, a corrugated metal reinforcing ring is disposed within a thickened heel portion of an annular molded body of resilient material of the elastomeric type. The annular body is provided with a radially extending lip connected to said heel portion by a web portion. Within the lip is a recess for receiving a garter spring which retains the lip contact with the journal member being sealed.

Specifically the metal ring defines a plurality of convolutions whose peaks provide a plurality of peripheral retention areas for maintaining the seal in sealing contact with the housing in which the seal is disposed. The peak portions are covered only by flash, .005 to .010 inch thick, from the molding of the resilient body. The convoluted surface also provides a mechanical interlock with the molded body. Additional mechanical interlock may be provided through the use of perforated metal for the reinforcing ring.

This invention provides the advantages of dimensional stability afforded by the use of metallic members without exposing the metallic surfaces to the corrosive atmospheres inherent in installations for which the seals of the invention are intended.

We are aware that a circumferential groove in the outer periphery of a rigid metal case of a packing seal for receiving an elastic gasket material which extends above the outer surface of the case has been disclosed in Patent No. 2,819,106, wherein it is also disclosed to perforate the bottom of said groove.

We are further aware that Patent No. 2,249,141 discloses a plurality of projections spaced about the periphery of a metal reinforcing member for a molded fluid seal.

We are also aware that Patent No. 2,736,586 discloses a series of spaced convolutes molded within a sealing body member to provide radial compression without distortion.

We are still further aware that Patent No. 2,889,163 discloses the application of a resin coat to the exterior of a metal case of a fluid seal to compensate for irregularities in the bore wall.

This invention is distinguished as follows:

In large diameter seals, 30 to 40 inches, it is desirable to provide essentially metal-to-metal and intimate contact between the sealing member and the housing bore in which said member is placed and to reduce opportunity for misalignment. In those sealing arrangements which rely on a narrow ridge of elastic material to effect sealing engagement, the chances for misalignment and twisting within the housing bore are greater than in the present invention where a plurality of concentric retention areas are provided.

The present invention solves the problem of corrosion, which is encountered by metal case-type seals and others which expose metal, by utilizing metal only as a reinforcing element and covering such element with elastomeric material. The metal element is not covered with thickness of such elastomeric material in the critical retention areas to the extent that will interfere with the stability of the sealing ring. However, the elastomeric material is not so thin as to be sheared and expose bare metal when press fitted into the bore housing. The thin covering at the retention areas is distinguishable from applied coatings in that the covering is formed integrally with and concurrently with the main molded body.

The corrugated periphery of the reinforcing ring of this invention provides a rigid member which relies upon the molded covering to compensate for irregularities in the housing rather than resiliency of the reinforcing member as do seals which employ spring or other helical members. Further, the series of concentric or coaxial corrugations define a plurality of spaced apart peripheral retention areas as opposed to a continuously spiral arrangement of the spring members. The perforations in the reinforcing ring of this invention complement the corrugations as mechanical interlock means for securing the molding material and are distinguishable in that their position is not limited to that of groove bottoms.

The novel features considered characteristic of this invention are set forth with particularity in the appended claims. The invention itself, however, will be understood from the following description of a specific embodiment when read in connection with the accompanying drawings in which similar numerals are employed to designate similar parts throughout and:

FIG. 1 is a fragmentary cross-sectional view of a seal in cooperation with a journal member and a housing;

FIG. 2 is a fragmentary perspective view of one embodiment of a reinforcing ring employed in the invention;

FIG. 3 is a fragmentary cross-sectional view of a seal illustrating an alternate form of reinforcing ring; and FIG. 4 is a fragmentary view, similar to FIG. 1, but incorporating circumferential grooves in the outer periphery of the seal.

Referring to FIG. 1, the seal generally designated by the numeral 10 positioned within housing 11 incorporates three principal elements: an annular molded body 12 of elastomeric material, preferably chemically inert; a corrugated metal reinforcing ring 14; and a garter spring 16. The configuration of the seal 10 is well known in the art. An outer heel portion 18 is interconnected to an inner lip 20 by a web portion 22. The lip 20 is provided with a recess 24 in which the garter spring 16 is positioned to urge the lip 20 radially inward to sealingly engage shaft or journal member 26. Normally, the inner diameter of lip 20 is less than the journal member being sealed and hence the lip 20 is deflected outwardly when the journal is inserted within the seal.

The corrugated metal reinforcing ring 14 is generally cylindrical and formed to provide a plurality of undulations 30 having peak portions 32 near the outer peripheral surface 34 of the molded body 12. An edge 15 is rolled to terminate in radial flange 17 to provide increased diametral stability. The diameter of the ring 14 at the peak portions 32 is preferably only sufficiently less than the diameter of the mold in which the molded body 12 is formed to provide .005 to .010 inch of flash as the molding material flows and forms the body 12 in a unitary shape around the ring 14.

The corrugated reinforcing ring 14 not only provides a more rigid reinforcing member than the flat strap type usually employed but also provides improved sealing by the intermittent pattern of the metal-elastomeric material. The valleys 36 of the undulations 30 provide a mechanical interlock between the ring 14 and the molded body 12. The mechanical interlock is further facilitated by providing the reinforcing ring 14 with perforations through which the molding material may flow during the molding operation. It will be apparent that expanded metal will admirably suit this purpose. Perforations in the form of slots 19 extending longitudinally of the axis of the ring 14 are preferred in order to resist shearing during insertion into the housing 11. The undulations 30 are preferably arranged in coaxial or concentric array to provide a plurality of retention areas at the peaks 32 which are separated from the housing 11 only by the molding flashing. The molding material can flow to accommodate minor differences in size due to manufacturing tolerances and yet provides sufficient coverage of the metal to protect the metal from the corrosive action of the environment in which such seals are usually installed.

The concentric arrangement of the retention areas also reduces sealing defects due to misalignment and to small foreign particles disrupting the peripheral engagement of the molded body with the housing. The plurality of concentric and axially intermittant retention areas in effect provides a plurality of peripheral sealing rings and if one is disrupted, the others may still maintain sealing engagement.

In the embodiment shown in FIG. 3, a corrugated metal radial flange 40 is provided to reinforce the radial 42 and web 22 portions. The radial flange 40 may be secured to peripheral reinforcing ring 14 by weldment 41 or may be formed integrally therewith. Such radial flange serves to increase the radial stability of the sealing member and the terminal end 44 confines the position of flexing of the lip 20 at the web portion 22. It is preferred that the depth of the corrugations in the radial flange 40 be limited to half the thickness of the web portion 22.

A circumferential groove 38, as shown in the embodiment of FIG. 4, may be provided in the molded body intermediate of the outwardly extending corrugations or peaks 32 of reinforcing ring 14. In many installations, grease and other contaminants are present in the housing and are not always carefully removed before the seal is installed. In such instances the foremost peak retention area serves as a wiper and the groove serves as a reservoir where the contaminants can collect and hence are less likely to flow to subsequent retention areas and disrupt the sealing effect. The groove 38 may also serve the function of a plenum where localized pressures, which may break through one of the retention areas, can be dissipated or equally distributed around the periphery of the seal. The distribution of the pressure deters disruption of the other sealing retention areas.

Although certain and specific embodiments of the invention have been shown and described, many modifications thereof are possible. Therefore, this invention is not to be restricted except as necessitated by the prior art and by the spirit of the appended claims.

What we claim is:

1. A seal adapted for use with a shaft which is subjected to elevated temperatures comprising: a generally cylindrical reinforcing ring having an extended axial position corrugated to present an undulated surface and having an edge rolled and terminating in a radial flange projection, and an annular body of elastomeric molding material covering said reinforcing ring, said body defining a peripheral thickened portion, a radially extending lip portion, and a web portion connecting said peripheral and said lip portions, said ring being molded within said thickened portion with the peak portions of said undulated surface being covered only by .005–.010 inch of flash as the molding material flows and forms said body in a unitary shape around said ring and provides said seal with an uninterrupted bearing surface said cylindrical ring having an external diameter of at least 30 inches.

2. A seal as described in claim 1 in which said ring presents a series of annular peaks and valleys and said peaks are perforated with slotted holes, said holes being slotted in a direction parallel to the central axis of said ring.

3. A sealing device for use between relatively moving elements comprising in combination: a reinforcing ring having a cylindrical axial flange junctured to a radial flange, at least one of said flanges being corrugated, said ring being sufficiently rigid to resist deformation upon insertion of said device between said elements; and a molded annular body of elastomeric molding material covering said ring, with the extreme outside surfaces of said ring being covered only by .005–.010 inch of flash as the molding material flows and forms said body in a unitary shape around said ring, said body having a web portion from which an annular sealing lip extends radially inwardly, there being an annular recess in said lip adapted to receive a retaining spring.

4. In a shaft seal as described in claim 3 wherein said radial flange is corrugated and the depth of the corrugations is approximately ½ the thickness of the web portion joining said body and said lip.

5. A fluid seal comprising in combination: an annular molded body of resilient material including a heel portion adapted to seal against a housing and a lip portion radially spaced from said heel portion and adapted to seal against a journalled member; and a generally cylindrical corrugated reinforcing ring molded within said heel portion with the surfaces of the outwardly extending convolutions of the corrugated ring being covered only by .005–.010 inch of flash as the molding material flows and forms said body in a unitary shape around said ring, said reinforcing ring being sufficiently rigid to resist deformation upon installation between said housing and said journalled member, said convolutions extending circumferentially of said ring to present a plurality of heel retention areas.

6. A fluid seal comprising in combination: an annular molded body of resilient material including a peripheral thickened portion, a radially extending lip portion, and a web portion connecting said peripheral and said lip portions; and a cylindrical reinforcing ring molded within said thickened portion, said ring having an extended and undulated axial portion with the outer peak portions of the undulations being covered only by .005–.010 inch of flash as the molding material flows and forms said body in a unitary shape around said reinforcing ring, said reinforcing ring being sufficiently rigid to resist deformation upon insertion between the members to be sealed.

References Cited by the Examiner
UNITED STATES PATENTS

| | | | |
|---|---|---|---|
| 2,162,104 | 6/39 | Mosher | 277—153 |
| 2,210,833 | 8/40 | Clough | 288—2 |
| 2,417,390 | 3/47 | Winkeljohn | 288—2 |
| 2,819,106 | 1/58 | Voorhees | 288—2 |
| 2,837,359 | 6/58 | Corsi | 277—153 |
| 2,992,151 | 7/61 | Niessen | 277—235 XR |

FOREIGN PATENTS 703,031  2/41  Germany.

LEWIS J. LENNY, *Primary Examiner.*

MORRIS M. FRITZ, SAMUEL ROTHBERG, EDWARD V. BENHAM, *Examiners.*